United States Patent
Yamanari et al.

(10) Patent No.: US 9,309,960 B2
(45) Date of Patent: Apr. 12, 2016

(54) GEAR DEVICE

(71) Applicants: Kenji Yamanari, Kariya (JP); Kazunori Ueno, Toyota (JP); Fumihisa Ishiguro, Nagoya (JP); Jun Hattori, Nishio (JP)

(72) Inventors: Kenji Yamanari, Kariya (JP); Kazunori Ueno, Toyota (JP); Fumihisa Ishiguro, Nagoya (JP); Jun Hattori, Nishio (JP)

(73) Assignees: TOYOTA JIDOSHA KABUSHIKI KAISHA, Toyota-shi (JP); OTICS CORPORATION, Nishio (JP)

( * ) Notice: Subject to any disclaimer, the term of this patent is extended or adjusted under 35 U.S.C. 154(b) by 0 days.

(21) Appl. No.: 14/410,735

(22) PCT Filed: Oct. 2, 2013

(86) PCT No.: PCT/IB2013/002182
§ 371 (c)(1),
(2) Date: Dec. 23, 2014

(87) PCT Pub. No.: WO2014/053901
PCT Pub. Date: Apr. 10, 2014

(65) Prior Publication Data
US 2015/0143937 A1   May 28, 2015

(30) Foreign Application Priority Data
Oct. 5, 2012   (JP) ................................ 2012-223030

(51) Int. Cl.
*F16H 57/04*   (2010.01)
*F16F 15/124*   (2006.01)
*F16H 57/00*   (2012.01)

(52) U.S. Cl.
CPC ............ *F16H 57/043* (2013.01); *F16F 15/124* (2013.01); *F16H 57/0006* (2013.01); *F16H 57/0031* (2013.01); *F16H 57/0493* (2013.01); *Y10T 74/19633* (2015.01)

(58) Field of Classification Search
CPC .............. F16H 57/043; F16H 57/0006; F16H 57/0031; F16F 15/124
See application file for complete search history.

(56) References Cited

U.S. PATENT DOCUMENTS

| | | | | |
|---|---|---|---|---|
| 1,572,519 | A | * | 2/1926 | Davis ............................... 74/492 |
| 2,446,942 | A | * | 8/1948 | McFarland ...................... 464/74 |

(Continued)

FOREIGN PATENT DOCUMENTS

| | | |
|---|---|---|
| JP | 7 208552 | 8/1995 |
| JP | 2001 41287 | 2/2001 |
| JP | 2001 193794 | 7/2001 |
| JP | 2002364731 A * | 12/2002 |

(Continued)

OTHER PUBLICATIONS

International Search Report Issued Mar. 27, 2014 in PCT/IB13/002182 Filed Oct. 2, 2013.

*Primary Examiner* — Terence Boes
(74) *Attorney, Agent, or Firm* — Oblon, McClelland, Maier & Neustadt, L.L.P.

(57) ABSTRACT

A damper structure for a gear device, which includes a first gear mounted to turn with respect to a shaft in a circumferential direction, a second gear mounted on the shaft to rotate integrally, a stopper rubber mounted on the second gear to face the first gear, and a pressing protrusion at the first gear to face the second gear. The stopper rubber is configured to be elastically deformed by pressing the pressing protrusion in a circumferential direction of the second gear during rotation of the first gear and be restored to the initial shape by separating the pressing protrusion during stop of the first gear. A recess for accumulating lubricating oil in the first gear is formed to face the stopper rubber.

5 Claims, 5 Drawing Sheets

(56) References Cited

U.S. PATENT DOCUMENTS 6,626,139 B1 9/2003 Horita et al.
2011/0136638 A1 6/2011 Sumiyoshi

FOREIGN PATENT DOCUMENTS

JP 2010 101473 5/2010
JP 2012 102749 5/2012

* cited by examiner

US 9,309,960 B2

GEAR DEVICE

BACKGROUND OF THE INVENTION

1. Field of the Invention

The present invention relates to a gear device.

2. Description of Related Art

A known damper structure for a gear device provides a damper effect by engaging a driven gear and a damper cover with each other (for example, see Japanese Patent Application Publication No. 2010-101473 (JP 2010-101473 A)). This damper structure for the gear device includes a supporting protrusion disposed at the damper cover, a pressing protrusion disposed at the driven gear, and a stopper rubber supported by the supporting protrusion. During rotation of the driven gear, the pressing protrusion is pressed to the stopper rubber, and the damper cover rotates together with the driven gear.

SUMMARY OF THE INVENTION

In the damper structure for the gear device in JP-A-2010-101473, the pressing protrusion is pressed to elastically deform the stopper rubber, and immediately the pressing protrusion is separated to restore the stopper rubber to the initial state. If this situation occurs repeatedly in short cycles, it is concerned that the stopper rubber generates heat to cause thermal degradation of the stopper rubber.

The present invention provides a gear device that reduces heat generation of the stopper rubber so as not to cause thermal degradation of the stopper rubber.

A gear device according to an aspect of the present invention includes a first gear, a second gear, a protrusion, and a stopper rubber. The first gear is disposed at a shaft to turn the first gear with respect to the shaft in a circumferential direction. The first gear includes a recess capable of accumulating lubricating oil. The second gear is disposed at the shaft to integrally rotate the second gear and the shaft. The protrusion is disposed at the first gear. The protrusion faces the second gear. The stopper rubber is disposed at the second gear. The stopper rubber faces the first gear. The stopper rubber is configured to be elastically deformed by pressing the protrusion in a circumferential direction of the second gear during rotation of the first gear. The stopper rubber is configured to be restored to an initial shape by separating the protrusion from the stopper rubber during stop of the first gear. The recess faces the stopper rubber.

The above gear device cools the stopper rubber using the lubricating oil accumulated in the recess when the stopper rubber elastically deforms along with the rotation of the first gear. As a result, the above gear device reduces heat generation of the stopper rubber compared with the conventional structure, so as not to cause thermal degradation of the stopper rubber.

In the above-described gear device, the recess may have an annular shape extending in the circumferential direction of the first gear.

The above gear device has a large amount of lubricating oil accumulated in the recess. This allows effectively cooling the stopper rubber.

In the above-described gear device, a length of a portion of the recess adjacent to the protrusion may be longer than a length of another portion of the recess in a radial direction of the first gear.

The above gear device has a large surface area immersed in the lubricating oil at the stopper rubber when the stopper rubber elastically deforms. This allows effectively cooling the stopper rubber.

The present invention provides a gear device that reduces heat generation of the stopper rubber compared with the conventional structure, so as not to cause thermal degradation of the stopper rubber.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
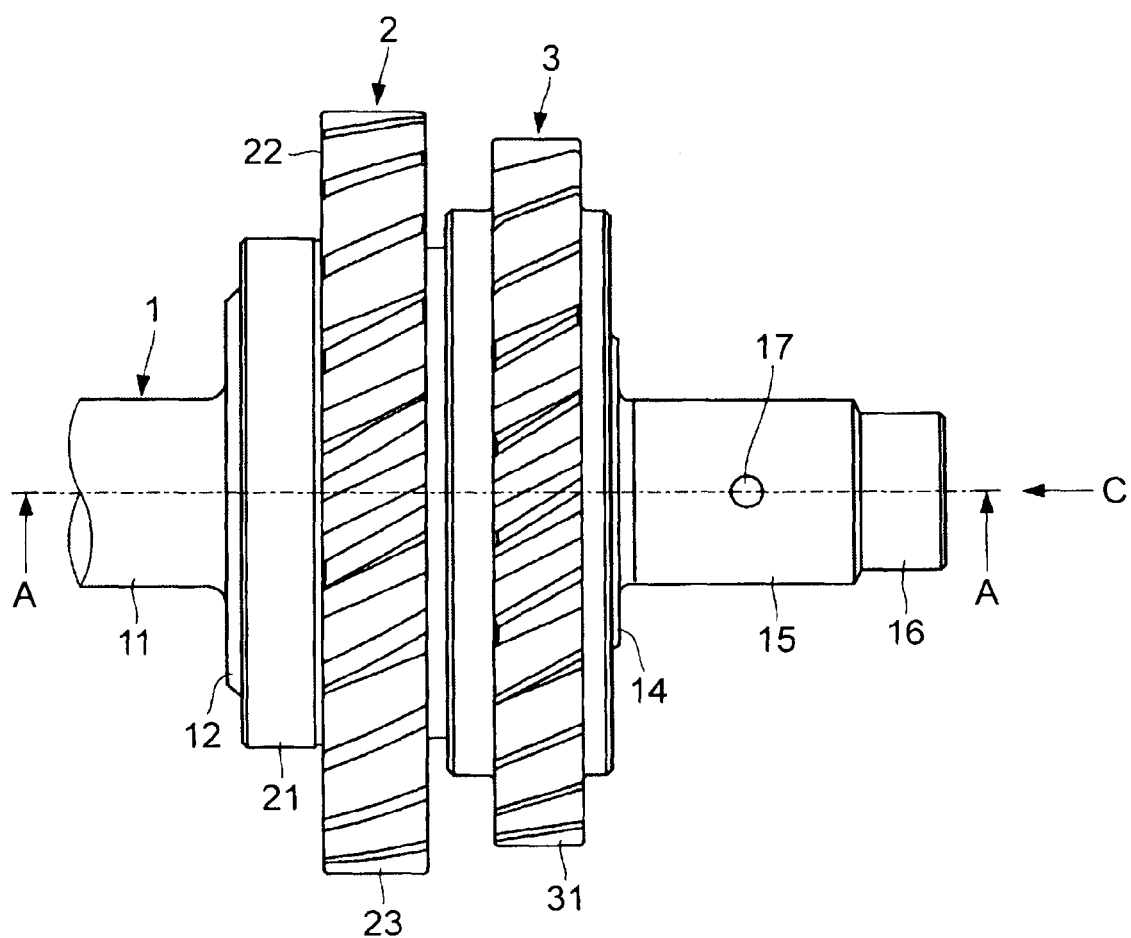
FIG. 1 is a side view illustrating a schematic structure of a damper structure of a gear device according to an embodiment of the present invention.

Hereinafter, a description will be given of an embodiment of a gear device according to an aspect of the present invention by referring to the accompanying drawings.

The gear device according to this embodiment includes a shaft 1, a first gear 2, a second gear 3, and a damper structure as illustrated in FIG. 1 to FIG. 5. The first gear 2 and the second gear 3 are coaxially assembled in the shaft 1. The damper structure includes a pressing protrusion 24 described later and a stopper rubber 33 described later.

Figure 2:
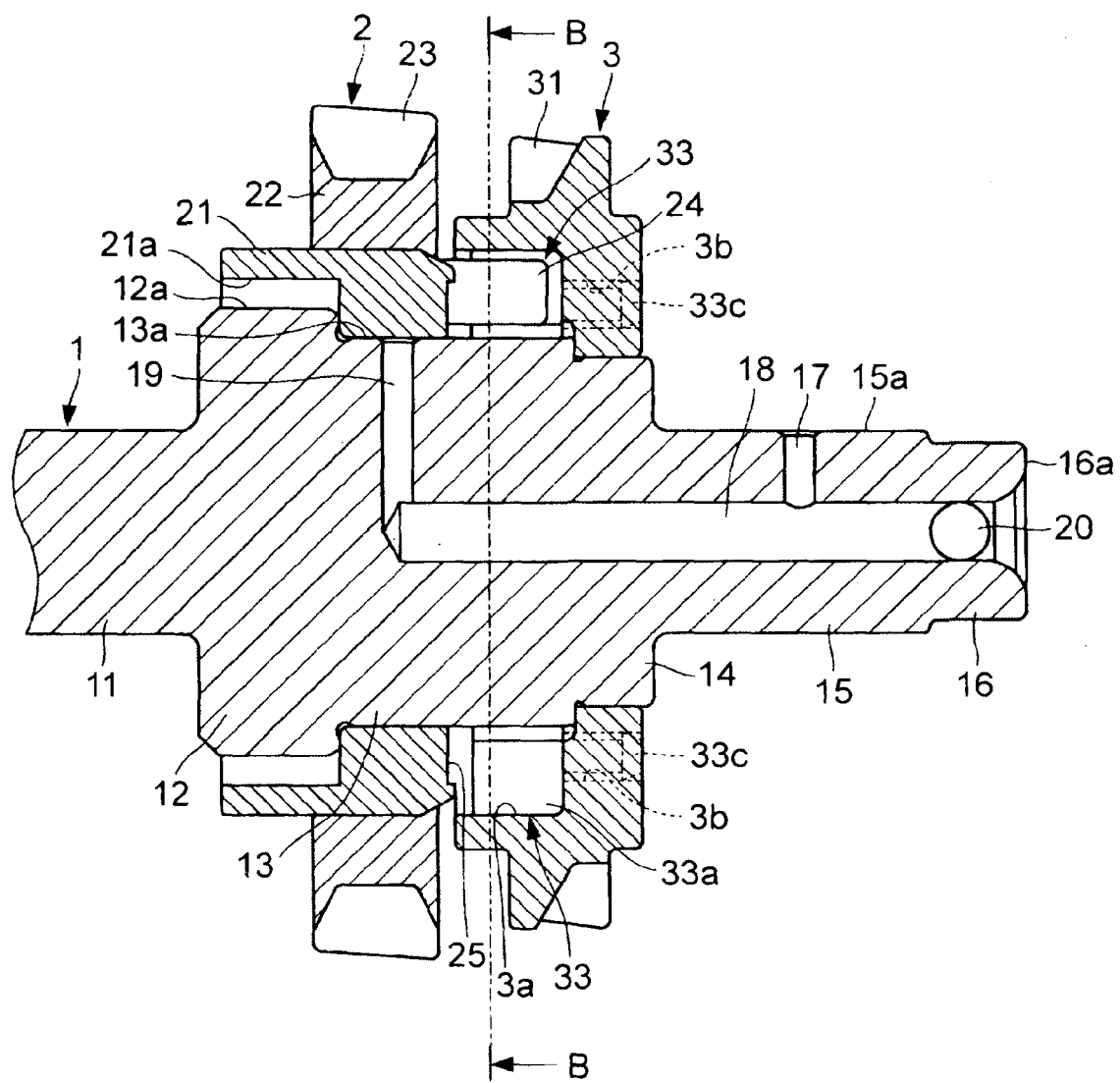
FIG. 2 is a cross-sectional view taken along the line A-A of FIG. 1.

The shaft 1 includes, as illustrated in FIG. 2, a first shaft portion 11, a second shaft portion 12, a third shaft portion 13, a fourth shaft portion 14, a fifth shaft portion 15, and a sixth shaft portion 16 that are coaxially integrated with one another in this order from the left side to the right side in the drawing, and made of metal.

The first shaft portion 11 includes a balance weight (not shown). The second shaft portion 12 is formed with a larger outer diameter than the outer diameter of the first shaft portion 11. The third shaft portion 13 is formed with a smaller outer diameter than the outer diameter of the second shaft portion 12.

The fourth shaft portion 14 is formed with a smaller outer diameter than the outer diameter of the third shaft portion 13. The fifth shaft portion 15 is formed with a smaller outer diameter than the outer diameter of the fourth shaft portion 14. The sixth shaft portion 16 is formed with a smaller outer diameter than the outer diameter of the fifth shaft portion 15.

Inside of the shaft 1, a first lubricating oil passage 17, a second lubricating oil passage 18, and a third lubricating oil passage 19 are formed.

The first lubricating oil passage 17 radially extends from an outer peripheral portion 15a of the fifth shaft portion 15 toward the center of the shaft 1. The second lubricating oil passage 18 extends from an end portion 16a of the sixth shaft portion 16 toward the third shaft portion 13 along the axis line of the shaft 1. The first lubricating oil passage 17 and the second lubricating oil passage 18 are communicated with each other inside of the fifth shaft portion 15.

The third lubricating oil passage 19 radially extends from an outer peripheral portion 13a of the third shaft portion 13 toward the center of the shaft 1. The third lubricating oil passage 19 and the second lubricating oil passage 18 are communicated with each other inside of the third shaft portion 13. In the second lubricating oil passage 18, a plug 20 is engaged with a portion inside of the sixth shaft portion 16.

The fifth shaft portion 15 is supported by a bearing (not shown). This bearing receives lubricating oil supplied from a lubricating oil pump. The lubricating oil pump is driven by a rotational force obtained from a crankshaft of a vehicle internal combustion engine (an internal combustion engine of a vehicle). The lubricating oil supplied to the bearing is delivered to the outer peripheral portion 13a of the third shaft portion 13 through the first lubricating oil passage 17, the second lubricating oil passage 18, and the third lubricating oil passage 19. The plug 20 functions to prevent the lubricating oil from flowing to the outside of the sixth shaft portion 16 from the second lubricating oil passage 18.

Figure 5:
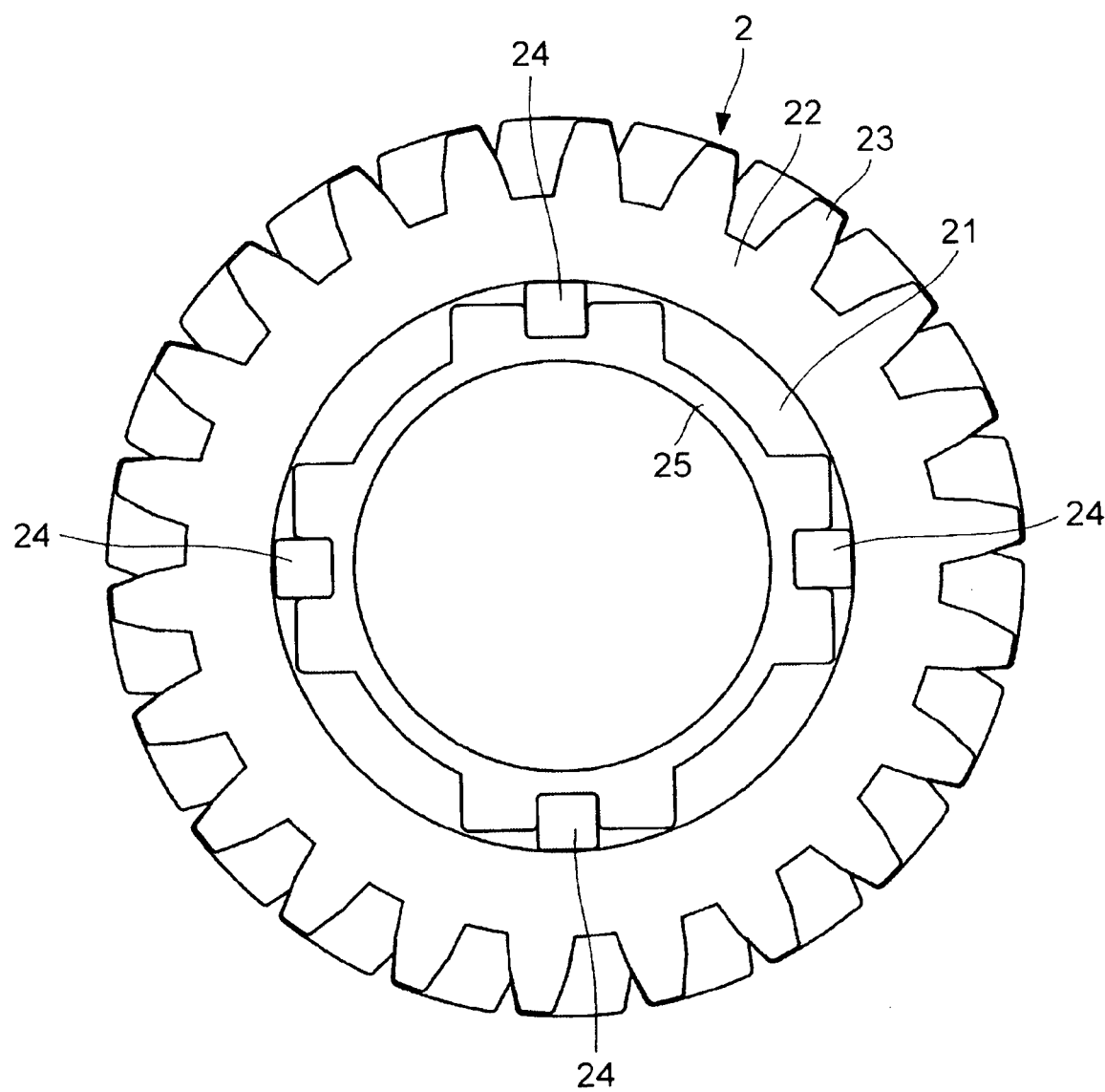
FIG. 5 is a front view of a first gear in FIG. 3.

The first gear 2 includes an annular insert 21 and an annular gear portion 22 as illustrated in FIG. 2 and FIG. 5. The insert 21 is formed of metal. The gear portion 22 is formed of fiber reinforced plastic using thermoset resin, for example, polyamide or phenol.

The insert 21 fits the third shaft portion 13 to turn in the circumferential direction. The insert 21 surrounds an outer peripheral portion 12a of the second shaft portion 12 across a clearance in the circumferential direction. A friction damper (not shown) is disposed in this clearance.

The friction damper is brought into contact with the outer peripheral portion 12a of the second shaft portion 12 and contacts an inner peripheral portion 21a facing the outer peripheral portion 12a of the second shaft portion 12 at the insert 21, so as to generate a friction force between the second shaft portion 12 and the insert 21.

The gear portion 22 surrounds the insert 21 in the circumferential direction, and is secured to the insert 21. The gear portion 22 includes an outer edge portion where teeth 23 are formed with equal spacing over the whole circumference.

Figure 3:
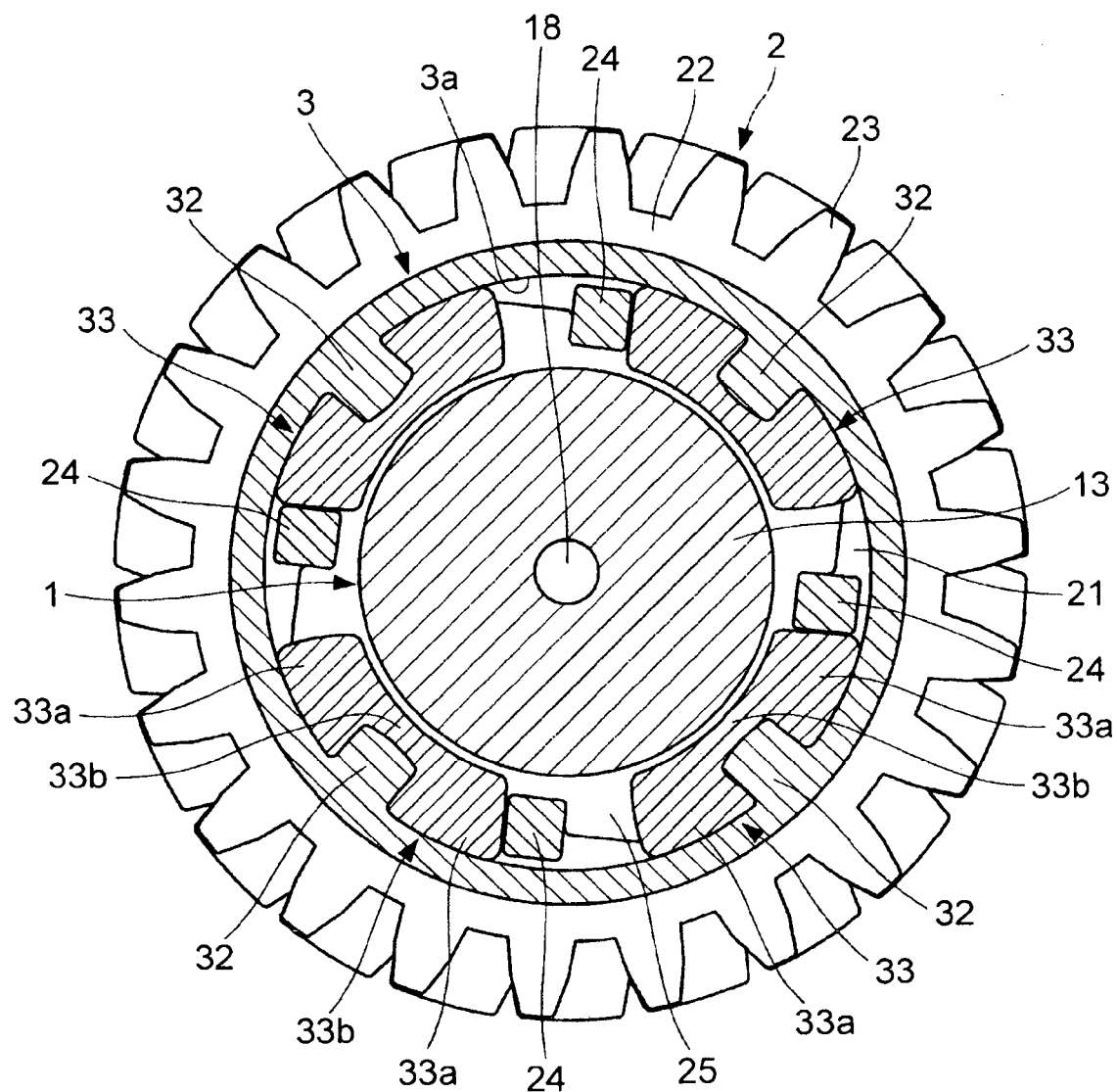
FIG. 3 is a cross-sectional view taken along the line B-B of FIG. 2.

At the insert 21 in the first gear 2, four pressing protrusions 24 are formed with equal spacing to protrude toward the second gear 3 in the circumferential direction as illustrated in FIG. 2, FIG. 3, and FIG. 5. Each pressing protrusion 24 includes an end portion at the second gear 3 side. The end portion has a tapered shape viewed in the radial direction of the first gear 2 and includes a corner portion formed by R chamfering (round chamfering).

The first gear 2 receives rotation of the crankshaft of the vehicle internal combustion engine transmitted via a gear (not shown). The first gear 2 rotates clockwise in FIG. 3.

Figure 4:
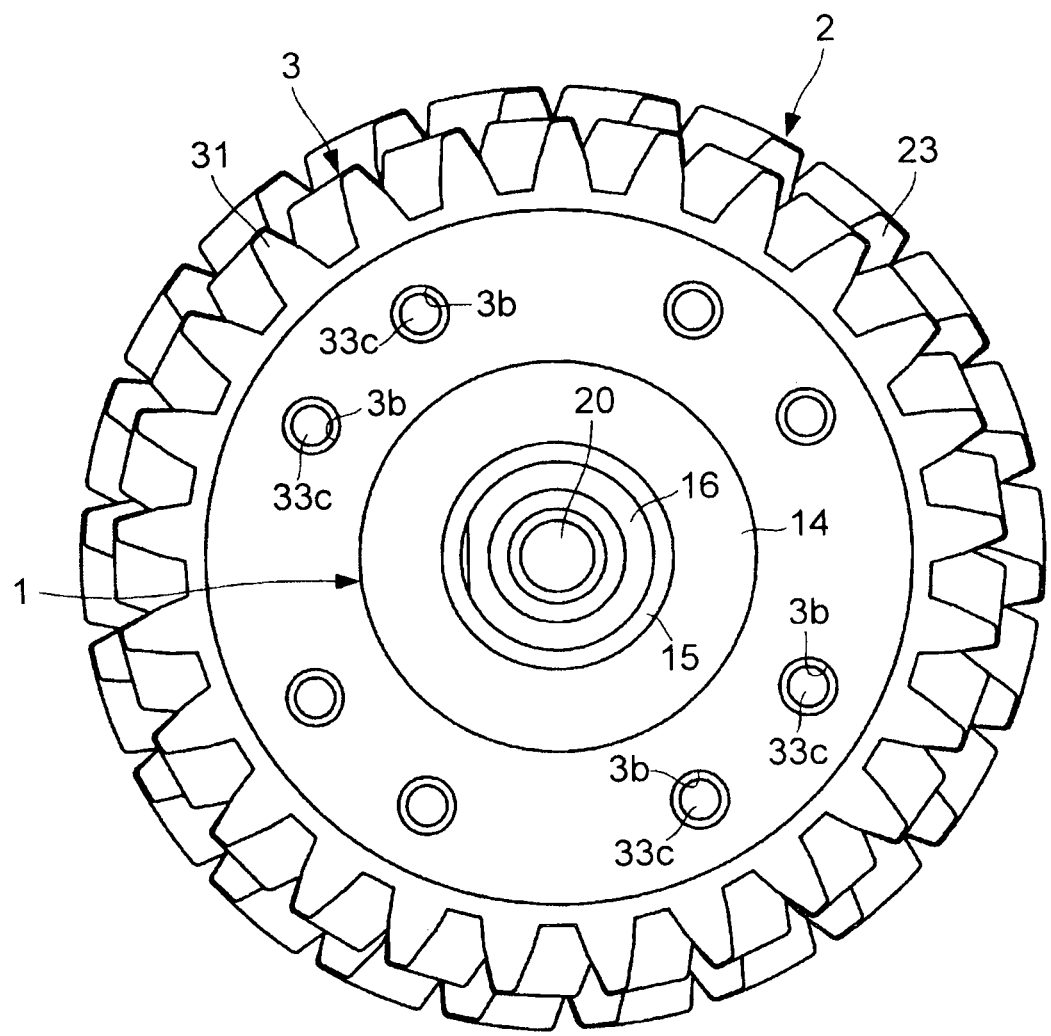
FIG. 4 is a diagram viewed from in the C direction of FIG. 1.

The second gear 3 is formed of metal. The second gear 3 includes an outer edge portion where teeth 31 are arranged with equal spacing in the circumferential direction as illustrated in FIG. 2 and FIG. 4. The second gear 3 fits the fourth shaft portion 14 to integrally rotate with the shaft 1.

The second gear 3 surrounds the outer peripheral portion 13a of the third shaft portion 13 across a clearance in the circumferential direction as illustrated in FIG. 2 and FIG. 3. The pressing protrusion 24 of the first gear 2 enters into the clearance.

In the second gear 3, four supporting protrusions 32 are formed with equal spacing to face the first gear 2 in the circumferential direction. Each supporting protrusion 32 in the second gear 3 radially protrudes toward the axis line of the shaft 1 from an inner peripheral portion 3a facing the outer peripheral portion 13a of the third shaft portion 13.

In the second gear 3, four stopper rubbers 33 are mounted with equal spacing in the circumferential direction to face the first gear 2 as illustrated in FIG. 2, FIG. 3, and FIG. 4. Each stopper rubber 33 is constituted of a pair of elastic deformation portions 33a, a coupling portion 33b, and a mounting piece 33c. The coupling portion 33b integrally couples both the elastic deformation portion 33a. The mounting piece 33c is formed at each elastic deformation portion 33a.

The stopper rubber 33 is positioned between adjacent pressing protrusions 24 in the circumferential direction as illustrated in FIG. 3. The pair of elastic deformation portions 33a sandwich the supporting protrusion 32 from both side of the circumferential direction of the second gear 3. The coupling portion 33b is disposed along an end portion of the supporting protrusion 32 at the center side of the second gear 3. The mounting piece 33c protrudes from the elastic deformation portion 33a in a direction opposite to the first gear 2. The mounting piece 33c fits a mounting hole 3b formed at the second gear 3.

Accordingly, the first gear 2 and the second gear 3 turn relative to each other between: a position where the pressing protrusion 24 presses the stopper rubber 33 at the clockwise side in the drawing; and a position where the pressing protrusion 24 presses the stopper rubber 33 at the counterclockwise side in the clockwise direction in the drawing.

The second gear 3 engages the gear (not shown) that includes the same number of teeth as the teeth of the second gear 3. This gear fits a shaft with a balance weight to integrally rotate with the shaft. That is, the shaft 1, the first gear 2, the second gear 3, the gear (not shown) meshed with the second gear 3, and the shaft (not shown) constitute a balancer device for reducing vibration of the vehicle internal combustion engine.

In the damper structure for the gear device according to this embodiment, the insert 21 includes a recess 25 where the lubricating oil is accumulated is formed to face the stopper rubber 33, as illustrated in FIG. 2 and FIG. 5.

The recess 25 in an annular shape extends in the circumferential direction of the first gear 2. In the recess 25, a portion adjacent to the pressing protrusion 24 is formed with a wider width (dimension of the first gear 2 in the radial direction) than widths (dimensions of the first gear 2 in the radial direction) of other portions.

Next, the operation of this embodiment will be described.

Start of the vehicle internal combustion engine transmits the rotation of the crankshaft to the first gear 2 through the gear (not shown) so as to rotate the first gear 2 clockwise in FIG. 3. When the first gear 2 starts to rotate clockwise in the drawing, the pressing protrusion 24 presses the stopper rubber 33 at the clockwise side. Accordingly, the stopper rubber 33 elastically deforms from the initial shape.

The rotation of the first gear 2 is transmitted to the second gear 3 and the shaft 1 through the pressing protrusion 24, the stopper rubber 33, and the supporting protrusion 32. Accordingly, the second gear 3 and the shaft 1 rotate in the same direction as a direction of the rotation of the first gear 2.

When the rotational speed of the first gear 2 during clockwise rotation in the drawing starts to decrease corresponding to the operating state of the vehicle internal combustion engine, the stopper rubber 33 at the counterclockwise side is pressed to the pressing protrusion 24 by the moment of inertia of the second gear 3 or similar member. Accordingly, the stopper rubber 33 elastically deforms.

In each pressing protrusion 24, the end portion at the second gear 3 side has a tapered shape (that is, where the surface of each pressing protrusion 24 in contact with the stopper rubber 33 is inclined with respect to the circumferential direction and is not a surface perpendicular to the circumferential direction), and is formed by R chamfering. Accordingly, when the pressing protrusion 24 and the stopper rubber 33 are brought into contact with each other, the pressing protrusion 24 does not damage the stopper rubber 33.

During the transition from the state where the pressing protrusion 24 presses the stopper rubber 33 at the clockwise side to the state where the stopper rubber 33 at the counterclockwise side is pressed to the pressing protrusion 24 (the state where the pressing protrusion 24 presses the stopper rubber 33 at the counterclockwise side), when the rotational speed of the first gear 2 coincides with the rotational speed of the second gear 3, the pressing protrusion 24 and the stopper rubber 33 separate from each other. Accordingly, the stopper rubber 33 is temporarily restored to the initial shape.

Stop of the vehicle internal combustion engine stops the rotation of the first gear 2. That is, the pressing protrusion 24 does not press the stopper rubber 33 at the clockwise side, and the pressing protrusion 24 does not press the stopper rubber 33 at the counterclockwise side. Accordingly, the stopper rubber 33 is restored to the initial shape.

During the operation of the vehicle internal combustion engine, the bearing that supports the fifth shaft portion 15 receives the lubricating oil supplied from the lubricating oil pump. The lubricating oil supplied to the bearing is delivered to the outer peripheral portion 13a of the third shaft portion 13 through the first lubricating oil passage 17, the second lubricating oil passage 18, and the third lubricating oil passage 19.

The lubricating oil, which is delivered to the outer peripheral portion 13a of the third shaft portion 13, continuously flows into the recess 25 formed at the insert 21 through the clearance between the insert 21 and the third shaft portion 13 so as to accumulate the lubricating oil in the recess 25.

Accordingly, if the pressing protrusion 24 is pushed to elastically deform the stopper rubber 33, and immediately the pressing protrusion 24 is separated to restore the stopper rubber 33 to the initial shape as a situation repeated in short cycles, the stopper rubber 33 is cooled by the lubricating oil accumulated in the recess 25. Therefore, the stopper rubber 33 does not generate heat, and this does not cause the thermal degradation of the stopper rubber 33.

The recess 25 in an annular shape extends in the circumferential direction of the insert 21. This allows accumulating a sufficient amount of lubricating oil to effectively cool the stopper rubber 33 in the recess 25.

The recess 25 has a wider width of the portion adjacent to the pressing protrusion 24 than the widths of other portions. This increases a surface area of the stopper rubber 33 immersed in the lubricating oil when the stopper rubber 33 elastically deforms, thus effectively cooling the stopper rubber 33.

As described above, the gear device according to the present invention has the effect to reduce heat generation of the stopper rubber so as not to cause thermal degradation of the stopper rubber, and is especially effective for a damper structure of a gear device in a vehicle internal combustion engine.

The invention claimed is:

1. A gear device comprising:
   a first gear disposed at a shaft to turn the first gear with respect to the shaft in a circumferential direction, the first gear including an insert that includes a recess extending in an axial direction of the insert to accumulate lubricating oil;
   a second gear disposed at the shaft to integrally rotate the second gear and the shaft;
   a protrusion disposed at the first gear, the protrusion facing the second gear; and
   a stopper rubber disposed at the second gear, the stopper rubber facing the first gear, the stopper rubber being configured to be elastically deformed by pressing the protrusion in the circumferential direction of the second gear during rotation of the first gear, the stopper rubber being configured to be restored to an initial shape by separating the protrusion from the stopper rubber during stop of the first gear, and the recess facing the stopper rubber,
   wherein the shaft includes an oil passage and the recess accumulates the lubrication oil supplied by the oil passage, and
   the recess faces the second gear and has an annular shape extending in the circumferential direction of the first gear.

2. The gear device according to claim 1, wherein
   a length of a portion of the recess adjacent to the protrusion is longer than a length of another portion of the recess in a radial direction of the first gear.

3. The gear device according to claim 1, wherein the oil passage includes a first oil passage, a second oil passage and a third oil passage, and
   wherein the first oil passage and the third oil passage each extend radially from the second oil passage which extends axially in the shaft.

4. The gear device according to claim 3, wherein the lubrication oil accumulated in the recess is supplied via the first oil passage, the second oil passage, and the third oil passage in succession.

5. The gear device according to claim 1, wherein the lubricating oil is supplied from an outer peripheral portion of a first portion of the shaft, on which neither the first gear nor the second gear is mounted, through an inside of the shaft to an outer peripheral portion of a second portion of the shaft, on which the first gear is mounted, and
   wherein the recess accumulates the lubrication oil from the outer peripheral portion of the second portion of the shaft.

* * * * *